Patented Feb. 21, 1933

1,898,754

UNITED STATES PATENT OFFICE

ROBERT W. BELFIT, OF WATERTOWN, CONNECTICUT, ASSIGNOR TO SCOVILL MANUFACTURING COMPANY, OF WATERBURY, CONNECTICUT, A CORPORATION OF CONNECTICUT

CONDENSATION PRODUCT AND PROCESS

No Drawing. Original application filed June 25, 1927, Serial No. 201,555. Divided and this application filed April 12, 1929. Serial No. 354,690.

The present invention relates particularly to lacquers produced from condensation products obtainable from the ureas, such as urea (carbamid), thiourea (thiocarbamid) and/or their derivatives, to a process of producing such compounds, and to certain types of lacquers containing the novel compounds, together with various modifying agents. The use of kindred compounds, as equivalents, broadly, of the ureas, for forming condensation products, is contemplated. For example, cyanamid ($NCNH_2$), guanidine ($HNC(NH_2)_2$) and/or active derivatives thereof may be employed in lieu of the ureas. These may all be classed as compounds having a group containing a carbon atom bonded to two or more nitrogen atoms, at least one of which is an amino-nitrogen.

An important object is the production of an improved blended lacquer.

Condensation products of the ureas are known, but hitherto they have been capable of little, or very limited, practical use. Likewise, condensation products of the derivatives, such as benzoylcarbamid, acetylcarbamid, etc., are known.

In accordance with the present invention, it is possible to combine with condensation products of the ureas a suitable chemical-resistivity increasing agent, for example, salicylic acid taken in considerable proportion, and thereby obtain a resultant product which is vastly more resistant to the action of solvents, sulphur compounds and other corrosive agents. The improved compound may be produced in the form of a solution employing suitable solvents, together with one or more modifying substances. From such a solution, it is possible to make a novel lacquer having improved characteristics. Such a lacquer may be employed, for example, in protecting metal surfaces, and is particularly valuable in protecting the surfaces of non-ferrous metals, such as silver, nickel, copper, brass, aluminum, and various alloys.

In forming the novel compound embodied in a solution, suitable as a lacquer, for example, it is preferred to preparatorily form a soluble condensation product of a urea and formaldehyde, or its equivalent; and in this procedure, it is preferred to employ urea and formaldehyde (40% solution) in the proportions of one gram of urea to about 5 cc. of formaldehyde. Commercial formaldehyde commonly contains a very small percentage of formic acid, generally not exceeding about .2 of 1%. Formaldehyde containing such a small percentage of formic acid may be employed in effecting the condensation of urea, if desired; or, formaldehyde free from formic acid may be employed.

The soluble condensation product of urea, for example, may be produced by reacting upon urea with formaldehyde or an equivalent reagent, such as the polymers of formaldehyde.

Condensation products of the ureas and equivalent materials listed above and aliphatic aldehydes may be referred to appropriately as condensation products of the urea-formaldehyde type.

In accordance with the present invention, a chemical-resistivity increasing agent, such as salicylic acid, is employed; and this agent preferably is introduced into the urea condensation product after the condensation product has been preparatorily formed, as described more fully in my co-pending application, Serial No. 201,555, filed June 25, 1927.

Where a lacquer is to be produced, the preferred procedure is to first produce the soluble urea condensation product in aqueous solution, and thereafter mix therewith a solution of the chemical-resistivity increasing agent, the latter solution employing an organic solvent, or preferably a plurality of organic solvents having low surface tensions and possessing different boiling points.

It is important, in producing a lacquer for application to metal surfaces, particularly, to employ a suitably balanced combination of solvents which will give to the lacquer a comparatively low surface tension, impart to it proper spreading qualities, and permit the progressive evolution of the solvents without injuring the film of lacquer applied to the surface to be protected.

The preferred combination of solvents for a lacquer made in accordance with the present invention comprises water and a plurality of organic solvents, preferably a low boiling solvent, such as ethyl alcohol (B. P. 78° C.), a medium boiling solvent, such as butyl alcohol (B. P. 118° C.), and a high boiling solvent, such as ethyl lactate (B. P. 154° C.), the latter being preferably used in relatively small proportion. The water, ethyl alcohol, and butyl alcohol, may be of approximately the same proportions, although preferably varying somewhat; and the ethyl lactate preferably is employed in considerably smaller proportion, largely for economical reasons.

As an example of the preferred process in which a urea condensation product is preparatorily formed and afterwards combined with a chemical-resistivity increasing agent, the following may be stated:

Dissolve 400 grams of urea $(CO(NH_2)_2)$ in 2000 cc. of 40% formaldehyde solution; heat the mixture on a steam bath until about 40 to 60% by weight of the mixture has been evolved; and then introduce into the remaining solution enough distilled water to restore its weight to about 75% of the weight of the original mixture. This leaves a moderately viscous liquid, or solution, of which approximately 60% is water containing considerable formaldehyde, the condensation product being held in solution. If desired, the liquor may be freed from the uncombined formaldehyde in any suitable manner, but it is preferred to allow some free formaldehyde to remain in the solution, where it apparently has a solvent action. The solution preferably is filtered to remove any insoluble present. It contains about 65 oz. of solids per gallon.

Having thus obtained a solution of urea condensation products, in which dimethylolurea

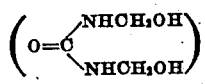

or a closely analogous compound, probably predominates, mix therewith a solution of salicylic acid in a solvent comprising ethyl alcohol, butyl alcohol and ethyl lactate, as follows:

| | |
|---|---|
| Urea condensation products solution (65 oz. per gal.) | 81 cc. |
| Denatured alcohol | 50 cc. |
| Butyl alcohol | 42 cc. |
| Ethyl lactate | 7 cc. |
| Salicylic acid | 5 grams |

The alcohols and ethyl lactate serve to hold the salicylic acid in solution and faciltate its intimate mixture with or dispersion throughout the solution of the urea condensation product. It will be noted that the only water present, in accordance with this procedure, is the water of the condensation products solution, except that there may be a small percentage of water in the alcohol. A lacquer produced in accordance with the method just described contains a high percentage of organic solvents. It is necessary that some water be present in the lacquer mixture, but the percentage may be varied within rather wide limits. However, it is desirable to lower rather than increase the percentage of water in the solvent, owing to the fact that the organic solvents mentioned possess a much lower surface tension than water and give to the lacquer a lower surface tension as a result. The low surface tension of the lacquer plays an important part in permitting the film to form properly on the metal surface. The ethyl lactate decidedly improved the spreading qualities of the lacquer; and, in the subsequent baking operation, tends to persist in the film during the hardening operation which converts the film to a highly resistant and insoluble condition. The low boiling alcohol and medium boiling alcohol, in addition to serving as solvents for the salicylic acid, give to the lacquer a desirably thinly viscous character, for dipping purposes. The solvents just mentioned may be largely evaporated in the air, or by heating at a temperature of about 100° C. for a short period; and the final hardening of the film may be accomplished by baking at a temperature of about 110° C.–135° C. for a suitable period, say about twenty minutes; or the hardening may be more rapidly effected by heating at a higher temperature, say a temperature of about 150° C. In some cases, five minutes baking will suffice.

The film may be applied to the metal surface by a dipping or other suitable process. After hardening the first film, the article may be dipped again and a second film applied in a similar manner, if desired, since the solvents of the lacquer will not dissolve the hardened film. This is a distinct advantage over cotton (pyroxylin) lacquers, for example.

It may be stated that a lacquer prepared in accordance with the process described above contains approximately 20% of solids, of which about one-eighth is salicylic acid. This, with the solvents employed, gives a suitable consistency to the lacquer where it is to be applied by a dipping process, and faciltates economical use of the lacquer. Upon distillation, 100 cc. of lacquer yielded 68 cc. of distillate containing about two-thirds of the original formaldehyde, amounting to about 9.5% of the lacquer.

It has been found that even a very thin film of the improved lacquer will successfully resist for prolonged periods the attacks of sulphur compounds, alcohol, air, moisture, salt-spray, etc., thus protecting the metal surface from tarnishing, or against corrosive action.

The improved lacquer possesses good keeping qualities, has a higher flash point than cotton lacquers, for example, yields a clear, hard, transparent film of high luster which is unusually resistant to tarnishing action of the air, highly resistant to solvents of the order of alcohol, acetone, etc., and highly resistant to sulphur and oxidizing agents, generally.

It has been found, for example, that a metal surface protected by the improved film will successively resist for many hours the attack of fumes from a 1% solution of potassium sulphide liquid, when the coated article is located in a closed desiccator above such a solution; and, also, the film is similarly resistant to attack of alcohol vapors and liquid alcohol. Handling, perspiration, etc., will not injure the film.

When the lacquer film is subjected to a baking operation, as set forth above, the salicylic acid enters into the reaction which occurs in converting the film to the final hard and insoluble condition. It seems evident that the salicylic acid combines chemically with the condensation products of the urea employed, producing complex compounds. It has been found advisable, for some purposes, to employ the salicylic acid in substantially as large proportion as will pass into solution in the solvents employed. It has been found, for example, that five grams of salicylic acid in the lacquer mixture set forth above is much better than three grams or less. The salicylic acid does not act to expedite the reaction and is not a catalyzing agent in the ordinary sense. It is known that salicylic acid will combine with formaldehyde to form a resinous product, and possibly to some extent such action occurs in hardening the present lacquer film. On the other hand, it is possible that the solvents employed may combine with such free formaldehyde as may be present in the mixture and be evolved with the solvents in the drying and baking operations. It is possible, also, that some of the free formaldehyde may combine with both the salicylic acid and urea condensation products by a complex reaction, in the baking of the film, but experience indicates that the free formaldehyde is practically eliminated from the lacquer in converting to the final insoluble state.

The insoluble film produced in the manner described is vastly more resistant to the action of sulphur, alcohol, etc., than is a film produced from the urea condensation products alone. It has been found, for example, that a film from a lacquer of urea condensation products, without the use of a chemical-resistivity increasing agent, will be attacked within a very small fraction of the time which would be required in the case of the improved lacquer described herein, when subjected to the sulphur test described above.

The lacquer, after application to the surface to be protected, may be air dried at room temperature, if desired. In any case, it is desirable to carry the drying to a point where the film is dry to the touch and the work may be handled, before subjecting the film to the final baking operation, which desirably is done at a temperature considerably above 100° C. The drying and baking may be done by subjecting to gradually increasing temperature, if desired. The film will char at about 200° C. Regardless of the exact nature of the chemical reactions which take place, a very dense clear and hard film is produced which adheres with great tenacity to the metal and which is continuous, or unbroken, being free from cracks, voids, etc., which, if present, might leave the metal open to attack at points. It is believed that the greatly increased chemical resistivity is due mainly to the formation of complex reaction compounds between the condensation products or urea and salicylic acid. It is possible that the effect is enhanced by the formation of different resinous products, which are, however, so thoroughly diffused, or blended, as to produce a practically homogeneous body in the final product. In any event, the film is dense, hard, and apparently wholly free from voids. Also, it is free from odor.

While it is preferred to form the urea condensation product by heating in the manner set forth above, it is to be remarked that the ureas and aliphatic aldehydes, such as formaldehyde, will combine to form condensation products at room temperatures. To effect the condensation in this manner, however, requires a period of many hours, so that it seems preferable to effect the condensation in the manner first stated; and this has the added advantage where a formaldehyde solution is employed, of enabling a proportion of the water to be evaporated, so that the lacquer may ultimately be a solution comprising a rather high percentage of organic solvents having low surface tensions. If desired, the formaldehyde may be made more concentrated by boiling off 25%, for example, of its volume before effecting condensation with the urea.

Also, it is to be remarked that the area condensation products may be produced in the presence of acid, in the presence of alkali, or in a practically neutral menstrum. For illustration, the formaldehyde solution may contain about .2% formic acid, or may be neutralized with potash, or made .2% alkaline, calculated as KOH. Larger proportions of acids, or alkalies, may be employed, however, but it is not desirable to use more than minute percentages of strong alkalies, or acids.

While one may dissolve the salicylic acid in organic solvents, before effecting mixture with the solution of urea condensation products, it is possible to first mix the organic solvents with the solution of urea condensation products and then mix therein the salicylic acid which goes into solution in the mixture.

When the urea condensation products solution is produced in the manner above stated, the solution ordinarily is practically water white and moderately viscous; and after a lacquer has been produced in the manner stated, the lacquer also is water white. It may happen, however, that in producing the solution of condensation products, insoluble or floating substances may form, giving the liquid a clouded appearance. Where such solution is not clear and of water-like whiteness, it may be made clear by filtering the liquor and thus removing bodies which give the clouded appearance. In some cases, iron is present as an impurity in the floating substances and ordinarily will be removed therewith in the filtering operation. If the iron be not removed before mixing the salicylic acid, the lacquer may acquire a slight reddish tint.

The proportions of materials employed in forming the soluble condensation products of urea may vary within rather wide limits; also the proportions of materials which form the lacquer may vary within rather wide limits. In forming the urea condensation product, it is not desirable to use much less than five parts of the formaldehyde solution to one part of the urea. Apparently, however, the proportion of formaldehyde may be increased considerably without great detriment to the process. Any large increase in the formaldehyde results, however, in the introduction of additional water into the solution of the condensation product; and, as indicated, this is undesirable, as it may render necessary excessive evaporation.

Various combinations of solvents may be employed in the lacquer. For example, one may employ water (present in the urea condensation products solution) and any suitable organic solvent, or mixture of organic solvents, such as normal propyl alcohol, iso-propyl alcohol, acetone, ethylene glycol monoethyl ether, isobutyl alcohol, benzene, butyl acetate, etc. Denatured alcohol may form a part of a suitable combination of solvents, where the denaturant is such as not to adversely influence the result. The denaturants approved by the Government for nitrocellulose lacquers do not seem to adversely influence the result. Some denaturants, such as zinc chloride, sulphuric acid, etc. adversely affect the product.

The following table gives the boiling points and approximate surface tensions, in dynes per centimeter, of the solution of urea condensation product given in the first example above, the organic solvents of the lacquer in the example given, water, and the lacquer produced in accordance with the first example given:

| Substance | Boiling point | Temp. approx. 72° F. surface tension in dynes per centimeter |
|---|---|---|
| Urea condensation products solution (65 oz. per gal.) | 100° C. | 59.4 |
| Denatured alcohol (ethyl) | 78° C. | 21.7 |
| N-Butyl alcohol | 118° C. | 22.4 |
| Ethyl lactate | 154° C. | 27.8 |
| Water | 100° C. | 72.2 |
| Lacquer | | 27.4 |

In the table it will be noted that the water has the highest surface tension and the alcohols the lowest. In order to have proper spreading of the lacquer and decrease the tendency of the film to coalesce on drying, it is necessary for the solution to have a low surface tension. The surface tensions of denatured alcohol, butyl alcohol and ethyl lactate are all comparatively low while their boiling points are respectively 78° C., 118° C., and 154° C. so that at all stages of the drying process there is present some low surface tension material. Denatured alcohol may be termed a "low boiler", butyl alcohol, a "medium boiler" and ethyl lactate, a "high boiler". In addition to the very desirable surface tension characteristics of denatured alcohol, butyl alcohol and ethyl lactate, their presence is necessary to dissolve the salicylic acid which is practically insoluble in water.

Another example of lacquer produced in the manner first described in this specification, but employing substitute organic solvents is as follows:

Solution of urea condensation (65 oz. per gal.) _____ 81 cc.
Isopropyl alcohol _____ 33 cc.
Normal propyl alcohol _____ 33 cc.
Ethylene glycol monoethyl ether _____ 33 cc.
Salicylic acid _____ 5 grams The lacquer just specified gives fairly satisfactory results. The boiling points and surface tensions of the organic solvents are stated in the following table:

| Substance | Boiling point | Surface tension in dynes per cm. at approx. 72° F. |
|---|---|---|
| Isopropyl alcohol | 82° C. | 21.0 |
| Normal propyl alcohol | 97° C. | 23.0 |
| Ethylene glycol monoethyl ether | 135° C. | 26.5 |

Experience indicates that it is desirable to have present organic solvents that have varying boiling points and low surface tensions (closer to the surface tension of ethyl alcohol than to that of water).

The salicylic acid referred to above is the common or commerical material, that is, orthohydroxy benzoic acid. The meta and the para hydroxy benzoic acids may be employed with good results, but the ortho is cheaper and readily available. However, when meta or para is employed, the reddish color will not result when iron impurities are present in the urea condensation product.

Substances which may serve as substitutes for the salicylic acids in the present invention are aromatic compounds, in which the compound has: (1) both a hydroxyl group and a carboxylic group; (2) derivatives therefrom, in which: (a) ammonium, magnesium or strontium has been substituted for the hydrogen of the carboxylic group or (b) an acetyl radical has been substituted for the hydrogen of the hydroxyl group to form acetyl salicylic acid. The following are examples of suitable compounds, and recognized equivalents are not to be excluded from the scope of the appended claims: salicylic acids, ammonium salicylate, acetyl salicylic acid, hydroxy-naphthoic acids, gallic acid, strontium salicylate, salicylamide, and magnesium salicylate. Of this list, the hydroxy benzoic acids are preferred, and the last three mentioned substances have proven only moderately good, the least desirable results having been obtained from the use of magnesium salicylate.

Of the salicylic acids, the ortho is preferred largely because it is more readily and cheaply obtainable. Acetyl salicylic acid and hydroxy-naphthoic acids give excellent results, but are more expensive than ortho salicylic acid.

Of the ingredients of a solvent comprising a plurality of organic solvents, it appears that ethyl lactate possesses a high boiling point and low surface tension; also that ethylene glycol monoethyl ether corresponds rather closely in these characteristics with ethyl lactate. Ethyl oxy butyrate is another example. Such solvents tend to persist in the film and to maintain its continuity until the hardening operation nears the final point. Any other suitable substance may be used as a substitute. It may be mentioned that the solvents here mentioned are alcohol-soluble and water-soluble. It may be added that these solvents and the alcohols are common solvents for the urea-formaldehyde condensation product, the salicylic acid or its equivalent, and for cellulose esters. That is, these solvents are solvents for any one or all of the three other substances here mentioned.

As has been indicated, the proportions in which the materials may be employed may be varied. The ratio of salicylic acid to urea preferably is from 15% to 200% of the urea employed in producing the condensation product. In the illustration given in the first example, the salicylic acid is perhaps 30% of the urea entering into the condensation product, and this is a preferred minimum, whilst a 15% ratio may be taken as a minimum below which one cannot go without reducing the efficiency of the ingredient to a point where its use would give slight benefit.

In case of the use of derivatives of urea, or thiourea, or other substitutes, the proper proportion of chemical-resistivity increasing agent to be combined therewith can be determined by the chemist; and where a substitute for salicylic acid is employed, the proportions will be varied to suit the case and in accordance with the results desired.

As has been indicated, it seems probable that the solvents do not enter into chemical combination with the solids, but are evaporated in the drying and baking operations.

The nature of the solvents and the combinations of solvents do affect the character of the film because of their properties to maintain uniform colloidal solutions of the solids during the drying process. This is a physical chemistry relation; and the miscibility and solubility of the solvents with respect to each other, and the surface tensions and boiling points are important factors connected with the deposition of the film. If more than 50% of water is present in the solvent as a whole, assuming the lacquer to contain about 20% of solids, there will be a tendency towards colloidal separation in the lacquer and the formation of two layers. Preferably, the water is about 25%, or less, but it is desirable to employ not substantially less than 5% water.

In the examples given above, the use of 1 gram of urea to 5 cc. of 40% formaldehyde solution is equivalent, in molecular proportions, to about 1 to 4.

While the molecular proportions employed in forming the soluble urea-formaldehyde condensation product are preferably 1 to 4, tests indicate that these compounds are finally present in the resultant product in the proportions of about 1 to 2; and, as indicated above, when the combination with the salicylic acid is effected, doubtless, complex compounds are formed between the salicylic acid and the urea-formaldehyde condensation products.

The improved compound may be employed for impregnating sheets of fibrous materials, cloths, paper fabrics, etc.; and the impregnated sheets may be consolidated, if desired, into a laminated product. This result may be accomplished in any desired way. For example, one may impregnate cloth fabrics, paper fabrics, or the like, with the lacquer, then dry the sheets, and then consolidate them in a highly heated press under heavy pressure.

A dip lacquer found suitable for impregnating cloth has the following formula:

| | Gallons |
|---|---|
| 30 oz. cotton in cello solve | 5 |
| Denatured alcohol | 15 |
| Butyl alcohol | 11 |
| Ethyl lactate | 10 |
| Urea-formaldehyde-salicylic acid lacquer | 7½ |
| Raw castor oil | 1½ |
| Dibutyl phthalate | 1½ |

The urea-formaldehyde-salicylic acid lacquer in the above formula has the following formula:

| Urea condensation products solution (95 oz. per gal.) | 85 cc. |
|---|---|
| Water | 5 cc. |
| Denatured alcohol | 40 cc. |
| Butyl alcohol | 35 cc. |
| Cello solve | 7½ cc. |
| Ethyl lactate | 7½ cc. |
| Raw castor oil | 5 cc. |
| Salicylic acid | 15 grams |

The percentage of plasticizers in this lacquer is very high, being 44.4% of the total solid constituents of the lacquer. Cloth impregnated with this lacquer is quite water proof.

It is possible to employ the salicylic acid in much higher proportions than stated in the examples given above. The resistance of the lacquer, for example, to sulphur fumes seems to increase with the percentage of salicylic acid, although not in the same ratio. As an example of a lacquer possessing a larger proportion of salicylic acid than has been given above, and possessing greater resistance to solvents, the following is given:

| Soluble urea-formaldehyde condensation products (65 oz. per gal.) | 81 cc. |
|---|---|
| Denatured alcohol | 60 cc. |
| Butyl alcohol | 42 cc. |
| Ethyl lactate | 7 cc. |
| Salicylic acid | 20 grams |

The alcohol-like solvents and diluents suitable for employment in the lacquer may include ethers, alcohols, ketones, esters; also, the solvents may include petroleum and coal tar hydrocarbons, terpenes, hydrocarbon chlorides, and suitable physical or chemical mixtures, of such solvents.

The salicylic acid appears to effect a homogeneous union of the water soluble constituent of the lacquer with the alcohol type of solvents. A lacquer was first mixed containing no salicylic acid and was allowed to stand, whereupon it became cloudy and separated into two distinct layers. Upon the addition of a small percentage of salicylic acid, and after a minute or two of stirring, the mixture completely cleared up. This dual nature of the urea-formaldehyde salicylic acid lacquers apparently explains the marked ability of such lacquers to assimilate a great variety of modifying substances or solutions.

A mixture of the urea-formaldehyde-salicylic acid lacquer and a potentially reactive phenolic condensation product may be made, and the resultant compound may be hardened under heat and pressure. Phenolic condensation product lacquers, such for example as "bakelite" lacquers, may be blended with the lacquers, in practically every proportion. It is preferred to first dilute the "bakelite" lacquer with a suitable thinner and then mix the diluted product with the urea-formaldehyde-salicylic acid lacquer. A suitable thinner for this purpose has the following formula:

| | Gallons |
|---|---|
| Butyl alcohol | 10 |
| Butyl acetate | 10 |
| Denatured alcohol | 40 |
| Benzole | 40 |

The thinner and the "bakelite" lacquer are mixed in about equal proportions. When the "bakelite" lacquer thus diluted is mixed with the urea-formaldehyde-salicylic acid lacquers, a white precipitate may sometimes form. This may be removed by filtration.

The blended lacquer thus produced has numerous advantages over both the "bakelite" lacquers and the straight or unblended urea-formaldehyde-salicylic acid lacquers. For example, the pronounced yellow color of a straight "bakelite" lacquer is reduced in proportion to the amount of urea-formaldehyde-salicylic acid lacquer that is added. Also tests show that the blended lacquer is more resistant than a straight urea-formaldehyde-salicylic acid lacquer. Experiments further indicate that the omission of salicylic acid in the blended lacquer results in a decrease in chemical resistivity. The salicylic acid also appears to facilitate the mixing of the two types of lacquers inasmuch as it tends to minimize the formation of any precipitate.

A blended lacquer, containing, in addition to urea-formaldehyde-salicylic acid lacquer and a phenolic condensation product lacquer, a certain amount of a cotton solution, has been found to give a clear film. Blended lacquers consisting, for example, of a cotton lacquer and "bakelite" lacquer do not always give a clear film. This indicates that it is the urea-formaldehyde-salicylic acid lacquer ingredient that tends to produce the clear film. A satisfactory lacquer of this type has the following composition:

| | Gallons |
|---|---|
| 10 oz. cotton in cello solve | 7½ |
| Denatured alcohol | 14 |
| Butyl alcohol | 10 |
| Ethyl lactate | 10 |
| Urea-formaldehyde-salicylic acid lacquer | 7½ |
| Bakelite lacquer | 1 |

Cello solve is ethylene glycol monoethyl ether. The formula of the urea-formaldehyde-salicylic acid lacquer in the above formula is as follows:

| | |
|---|---|
| Urea condensation products solution (65 oz. solids per gal.) | 81 cc. |
| Denatured alcohol | 50 cc. |
| Butyl alcohol | 42 cc. |
| Ethyl lactate | 7 cc. |
| Salicylic acid | 10 grams |

A blended lacquer approaching a phenolic condensation product lacquer within a urea-formaldehyde-condensation product lacquer was made by adding ammonia and phenol to a mixture of urea and formaldehyde in suitable solvents. The ammonia tends to catalyze the reaction between the phenol and the excess formaldehyde. The lacquer was quite effective on brass. The use of too much phenol and ammonia impairs the resistivity of the film. The addition of salicylic acid, however, has a pronounced beneficial effect.

Tests indicate that in a blended lacquer of this general type the resistivity of the film is increased, within certain limits, by the presence of either salicylic acid or a phenolic condensation product lacquer, or both. For example, if salicylic acid is omitted, but the proportion of "bakelite" lacquer is sufficiently high, for example half of the amount of the urea-formaldehyde lacquer, a fairly resistant film will be obtained. However, when the proportion of "bakelite" lacquer was but one-fifth of the urea-formaldehyde lacquer, the film was not very resistant to sulfur fumes.

The following may be given as a typical example of a bulk dip blended lacquer of the "bakelite" type.

A

| | Gallons |
|---|---|
| Urea-formaldehyde-salicylic acid lacquer | 15 |
| Mastic solution | ½ |
| Thinner | 30 |

B

| | Gallons |
|---|---|
| "Bakelite" lacquer | 3 |
| Thinner | ½ |

The ingredients under "A" are mixed separately and those under "B" are also mixed separately, after which mixture "B" is added to the mixture "A", while stirring. The urea-formaldehyde-salicylic acid lacquer used in the above formula is the same as that last given above.

The mastic solution used in the above formula is made by dissolving 6 lbs. of natural gum mastic in 1 gallon of cello solve, and after dissolving there is added one-half gallon of equal parts of denatured alcohol and water.

The thinner used in the above solution designated "A" has the following formula:

| | Per cent |
|---|---|
| Denatured alcohol | 50 |
| Butyl alcohol | 35 |
| Ethyl lactate | 5 |
| Water | 10 |

The thinner used in the above solution designated "B" contains butyl alcohol, butyl acetate, denatured alcohol and benzol in proportions already given.

The above blended lacquer is very good for lacquering hardware on rubber footwear. During the vulcanizing of such goods, this lacquer has been found to withstand a temperature of 270° F. in a chamber filled with sulphur and ammonia fumes. Two coats preferably are applied, the first being baked at 240° F. for 30 minutes and the second coat at 260° F. for 30 minutes.

The urea-formaldehyde-salicyclic acid lacquers may be successfully blended with a cellulose lacquer in varying ratios. As an example, 60% of a suitable cotton lacquer and 40% of the novel lacquer described above may be blended. On the other hand, blended lacquer may be produced containing as little as 8% of the cotton lacquer. The blending can best be effected by mixing together a completely formulated cotton lacquer with a completely formulated lacquer comprising urea-formaldehyde-salicylic acid.

The following may be given as a typical mixed lacquer, namely, 1 part of the improved lacquer described above and 2 parts of a cellulose lacquer, such as the following:

| Cellulose lacquer | Gallons |
|---|---|
| 10 oz. cellulose ester (per gallon of product) in butyl acetate | 13 |
| 30 oz. cellulose ester (per gallon of product) in butyl acetate | 1½ |
| Butyl acetate | 7½ |
| Butyl alcohol | 7 |
| Denatured alcohol | 6½ |
| Benzol | 9 |
| Shellac solution (5 lb. per gal. alcohol) | 3½ |
| Mastic (3 lbs. mastic in 1 gal. equal parts butyl acetate and denatured alcohol) | 2 |

The blended lacquer just described, of which the cotton lacquer forms a part, may be satisfactorily applied by spraying, or by dipping. It will harden to the touch at room temperature in about twenty minutes, but in order that it may resist sulphur and alcohol fumes, the lacquered work should be baked at a suitable temperature, such as 135° C., for about twenty minutes.

The solids in the blended lacquer which has just been described are:

| | Ounce/gallons |
|---|---|
| Cotton | 2.3 |
| Shellac | 2.4 |
| Mastic | 0.9 |
| Urea-formaldehyde-salicylic acid resin | 9.7 |

The gums, shellac and mastic, are desirable, but they are not absolutely necessary.

Various ingredients may be introduced into the novel composition of matter described. For example, castor oil in moderate percentage may be incorporated in the lacquer, and will serve as a plasticizer, tending to make the film more pliable and tenacious aiding in insuring the continuity of the film, and tending to render the film more impervious to liquids.

As an example of a lacquer containing castor oil and giving good results, the following is given:

| | |
|---|---|
| Solution of urea condensation products (first described) (65 oz. per gal.) | 81 cc. |
| Denatured alcohol | 50 cc. |
| Butyl alcohol | 41 cc. |
| Ethyl lactate | 7 cc. |
| Castor oil | 1 cc. |
| Salicylic acid | 3.5 grams |

In this lacquer, the castor oil is present in proportion equal to about 2⅓% of the solids.

Other ingredients acting more or less as plasticizers may be substituted for castor oil, as, for example, oleic acid, mastic, natural resins, etc.

The use of castor oil in a blended lacquer has a very beneficial effect on the resistivity of the film. A spray lacquer was made having the following formula:

| | Gallons |
|---|---|
| 10 oz. nitrated cotton in butyl acetate | 7 |
| Denatured alcohol | 15 |
| Butyl alcohol | 11 |
| Cello solve | 2½ |
| Diacetone alcohol | 5 |
| Ethyl lactate | 2½ |
| Castor oil | ½ |
| Urea-formaldehyde-salicylic acid lacquer | 6 |
| Mastic solution | ½ |

The diacetone alcohol may be replaced advantageously by ethylene glycol monoethyl ether.

The urea-formaldehyde-salicylic acid lacquer in the above formula has the following formula:

| | |
|---|---|
| Urea condensation products solution (65 oz. per gal.) | 81 cc. |
| Denatured alcohol | 50 cc. |
| Butyl alcohol | 42 cc. |
| Ethyl lactate | 7 cc. |
| Salicylic acid | 10 grams |

The castor oil forms about 20% of the solid constituents of this lacquer and a film produced therefrom on silver stood up very well under a two weeks' sulphur test. Viscosity may be varied by the amount and kind (raw or processed) of castor oil employed.

A lacquer of the same type but containing no castor oil did not successfully resist a 24-hour sulphur test. It is often desirable, particularly when a heavy film is desired, to use a blended cotton lacquer containing castor oil instead of a blended bakelite lacquer. For example, a bulk dip lacquer containing bakelite does not give as smooth a coating as a blended cotton lacquer containing castor a blended cotton lacquer containing castor oil in an amount up to 7–10% of the solid constituents of the lacquer. Though the bakelite constituent is omited, the lacquer is nevertheless very resistant. A typical lacquer of this type has the following formula:

| | Gallons |
|---|---|
| 30 oz. cotton in butyl acetate | 2½ |
| Denatured alcohol | 13½ |
| Butyl alcohol | 12 |
| Cello solve | 5 |
| Ethyl lactate | 5 |
| Distilled water | 1¾ |
| Castor oil | ¼ |
| Urea-formaldehyde-salicyclic acid lacquer | 10 |

The urea-formaldehyde-salicylic acid lacquer in the above formula is the same as that given in the last example referred to above.

The castor oil gives greater flexibility to the film and tends to increase its resistance to sulphur fumes. The raw oil blends more readily than a processed oil. It is also beneficial in the compounding of the lacquer enamels hereinafter referred to. A spray lacquer in which a processed castor oil was present in the amount equal to about 17% of the solid constituent of the lacquer gave a clear film which was very resistant to sulphur fumes.

As will more fully appear hereinafter, by using solutions containing higher concentrations of the urea-formaldehyde-salicylic acid resin, and consequently keeping down the percentage of water present, it is possible to incorporate in the lacquer much larger quantities of castor oil.

It has been found that the urea-formaldehyde salicylic acid first described above may be blended with lacquer enamels which are on the market in this country. In effecting such blending, it is advisable sometimes to prepare initially a special blending lacquer, such as the following:

*Blending Lacquer No. 1*

| | Gallons |
|---|---|
| Lacquer first described above | 30 |
| Ethyl lactate | 10 |
| 10 oz. cotton in ethylene glycol monoethyl ether | 10 |

*Blending Lacquer No. 2*

| | Gallons |
|---|---|
| Lacquer first described above | 25 |
| Ethyl lactate | 10 |
| Denatured alcohol | 5 |
| 10 oz. cotton in butyl acetate | 10 |

In blending with the cotton lacquers on the market mentioned above (Du Pont Company, C. Zapon Company, Essex Varnish Company, Van Schaack Chemical Bros.) mix from 1 to 2 parts of the blending lacquer with 1 part of the lacquer enamel. The lacquer enamels on the market which have been referred to contain usually about 2 parts of cotton to 1 part of a natural gum, and some solid pigments, and, if desired, a dye, or coloring matter. The cotton gives to the solution a high viscosity which prevents the pigments from settling out. The solvents used in compounding the lacquer enamels are similar to those mentioned above as alcohol-like solvents, but, in general, having the higher boiling points to cause slower drying. These lacquers also contain plasticizers, such as butyl stearate, butyl tartrate, castor oil, chinawood oil, dibutyl phthalate, tricresyl phosphate, and triphenyl phosphate. The combination, or mixture, of cotton-gum lacquer enamel and a blending-lacquer, as described, gives a film of greater luster, greater hardness, greater adhesion to metal and greater resistance to alcohol and water than the usual lacquer enamels. Baking at high temperature apparently frees the film from odor, also. Such mixtures may also be used in forming plastics.

The special blending lacquer described above contains some cotton and solvents, in addition to the urea-formaldehyde-salicylic acid lacquer. Should the latter be added alone to the lacquer enamel, it may cause some of the pigments to coagulate.

In the production of imitation of vitreous enamels from the urea-formaldehyde-salicylic acid lacquers, it is not necessary to use a cotton solution inasmuch as it has been found that the requisite viscosity may be obtained by using a more concentrated intermediate urea-formaldehyde-condensation products solution. For example, a spray lacquer is made by taking a urea-formaldehyde condensation products solution containing 65 oz. of solids per gallon, evaporating 40% of the solvent, then adding to the concentration solution about 9% ethyl lactate (to prevent jellying); this concentrated intermediate solution was then mixed with the proper proportions of solvents, salicylic and castor oil to form a lacquer having 67 oz. solids per gallon (55 oz. of this being the urea-formaldehyde resin).

A lacquer of this consistency is very useful in the preparation of imitation vitreous enamels. As the lacquer contains water, as well as alcohol type of solvents, it is possible to employ both water soluble dyes and alcohol soluble dyes. There are on the market only a few alcohol soluble dyes which are at all light fast. It is therefore extremely advantageous to be able to use water soluble dyes, since they offer a much greater variety of colors, and as a rule stand a high baking temperature, much better than the alcohol soluble dyes. By using several coats of a lacquer of this type the characteristic depth of color and luster of the true vitreous enamels is obtained.

By the evaporation of a lacquer of high viscosity of the type just referred to some of the water and formaldehyde may be removed. A thinner may then be added to the evaporated lacquer to give the desired concentration. A lacquer concentrated in this manner has much greater capacity for taking up large quantities of vegetable and animal oils than the straight unevaporated lacquers. For example, a lacquer having the following formula:

| | |
|---|---|
| Urea-formaldehyde condensation products solution (95 oz. per gal.) | 90 cc. |
| Denatured alcohol | 45 cc. |
| Butyl alcohol | 40 cc. |
| Ethyl lactate | 5 cc. |
| Salicylic acid | 15 grams | was evaporated until 55% of the solvents were volatilized, and sufficient thinner was added to bring the resultant weight up to 78% of the original weight. The thinner refered to above has the following formula:

| | Per cent by volume |
|---|---|
| Denatured alcohol | 45 |
| Butyl alcohol | 40 |
| Ethyl lactate | 10 |
| Water | 5 |

This re-evaporated lacquer contained 61 oz. per gallon of solids. It could be readily sprayed and would flow out smoothly to produce a much heavier film than the ordinary lacquer film. The film is rendered more flexible by the addition of castor oil. The lacquer may be satisfactorily mixed with relatively large amounts of a processed castor oil. For example, a perfectly clear lacquer was prepared containing a processed castor oil in an amount equal to 18.6% of the solid constituents. In a high concentration lacquer, but one which has not been re-evaporated, the even more soluble raw castor oil can only be added in an amount equal to 2.4% of the solid constituents. It is evident that the re-evaporation of the urea-formaldehyde-salicylic acid lacquer offers wide possibilities particularly in the field of blending with the various oils, such as castor oil, chinawood oil, soya bean oil, the animal oils, and possibly the mineral oils. Dyes or pigments may be added.

The dyed or pigmented enamels prepared from the urea-formaldehyde-salicylic acid lacquers have a distinct advantage over the imitation vitreous enamels inasmuch as it is not necessary to use nearly as high a baking temperature. Moreover, when applied to light metal, such as vanity-box cover, for example, there is very little tendency toward warping.

Pigmented enamels may be produced from the new composition of matter. Pigments may be introduced in any of the following ways:

(1) By adding dry pigment (powder) to the lacquer comprising a condensation product of the urea-formaldehyde type mixed with salicylic acid, for example, and grinding the materials together in a pebble mill.

(2) By grinding pigments in a plasticizer and then adding the same to a lacquer comprising a condensation product of the urea-formaldehyde type and salicylic acid, for example.

(3) By grinding pigment in a cellulose ester solution and adding the same to a solution of a condensation product of the urea-formaldehyde type and salicylic acid, for example.

Among the various pigments used may be mentioned: titanium oxide and titanox (white); carbon black; toludine and Para reds; burnt umber; burnt sienna; Prussian blue; and chrome greens. Finely ground materials for giving body and/or cheapening the cost may be added, if desired. Also, it may be desirable in certain cases to add waxes in small proportion.

The lacquer described above may be evaporated at a temperature below 100° C. to a solid which is dry to the touch, but somewhat gummy in consistency. This eliminates excess formaldehyde and some solvents, including water. It may then be dissolved in a thinner comprising a plurality of solvents. For example, the following thinner may be used:

| | Per cent by volume |
|---|---|
| Denatured alcohol | 45 |
| Butyl alcohol | 40 |
| Ethyl lactate | 10 |
| Water | 5 |

This procedure gives an air-drying lacquer.

This application constitutes a division of my application, Serial No. 201,555, filed June 25, 1927.

By preparatorily producing a condensation product of an aliphatic aldehyde and a urea, or equivalent material, and then mixing therewith salicylic acid, or an equivalent material, a composition of matter is provided which can be converted into the final infusible substantially insoluble condition, and the procedure noted enables the reactions to be easily controlled. For example, in preparing the aldehyde-urea condensation product, employing a large excess of formaldehyde solution in the preparation, it is possible to prolong the cooking operation many hours without injury to the product.

Moreover, the solution of the condensation product just mentioned may be kept indefinitely without danger of solidification and may be used as a source of supply for preparing improved lacquer; and the improved lacquer is then readily prepared by mixing with the solution of said condensation product an organic solvent comprising a plurality of low surface-tension organic solvents having substantially different boiling points, and salicylic acid, or the like. In this mixing operation the formaldehyde solution and the organic solvents cooperate in dissolving and holding in solution the salicylic acid; and the improved lacquer thus produced may be kept indefinitely without danger of solidification and finally may be applied to the surface of an article, dried and hardened, thus producing a final infusible and substantially insoluble film of the improved character noted above.

The procedure here referred to possesses important advantages over the procedure of initially mixing, for example, urea, formaldehyde, and salicylic acid, and then heating the mixture to cause reaction. In such procedure, it is impossible to control the reaction in such manner as to obtain the best technical results, and there are numerous objections which apply to such procedure and do not apply to the procedure whereby the condensation product of urea and formaldehyde is preparatorily formed and afterwards mixed with salicylic acid, for example, before subjecting to heat treatment to produce a final infusible and substantially insoluble product.

The expression "a urea-aldehyde condensation product" used in the appended claims should be understood as a descriptive expression, and not intended to unduly limit the invention. Thus, where the prior art permits, the use of the expression noted is not to be understood as excluding equivalent condensation products, but rather to include condensation products formed by combining aliphatic aldehydes and the ureas, or equivalent substances, set forth at the beginning of the specification.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The process of producing a composition which is convertible by heat to substantially insoluble condition, which comprises mixing: a solution of a urea-aldehyde condensation product; a compound adapted to combine with said condensation product under the action of heat to form a substantially insoluble product, said compound being selected from a group consisting of the following compounds, namely, salicylic acids, ammonium salicylate, acetyl salicylic acid, hydroxynaphthoic acids, gallic acid, strontium salicylate, salicylamide, and magnesium salicylate; a solution of a cellulose ester; and a common solvent for said condensation product, said compound, and said cellulose ester, comprising an organic solvent having a high boiling point adapted to improve the spreading qualities of and persist in the mixture until it nears the final stage of reaction, the solvent being taken in proportions adapted to produce a clear lacquer.

2. The process set forth in claim 1 as practiced by employing as the common solvent a mixture of low surface-tension organic solvents, including organic solvents having substantially different boiling points which are substantially lower than that of the high boiling point solvent.

3. The process of producing a composition which is convertible by heat to substantially insoluble condition which comprises mixing: an aqueous aliphatic aldehyde solution or a urea-aldehyde condensation product; a compound adapted to combine under the action of heat with said condensation product to form a final substantially insoluble product, said compound being selected from a group consisting of salicylic acids, ammonium salicylate, acetyl salicylic acid, hydroxy-naphthoic acids, gallic acid, strontium salicylate, salicylamide, and magnesium salicylate; a relatively small portion of a cellulose ester solution; and a common solvent for said condensation product, said compound, and said cellulose ester, taken in proportions to produce a clear product, said solvent including a solvent having a high boiling point adapted to improve the spreading qualities of and persist in the mixture until it nears the final stage of reaction, thus producing a blending lacquer; and finally compounding said blending lacquer thus produced with an additional solution of a cellulose ester.

4. A lacquer comprising in unreacted condition a mixture of an aliphatic aldehyde solution of a urea-aldehyde condensation product; a compound adapted to combine under the action of heat with said condensation product to form a final substantially insoluble product, said compound being selected from a group consisting of salicylic acids, ammonium salicylate, acetyl salicylic acid, hydroxy-naphthoic acids, gallic acid, strontium salicylate, salicylamide, and magnesium salicylate; a solution of a cellulose ester; and a common solvent for said condensation product, said compound, and said cellulose ester, taken in proportions to produce a clear lacquer, said solvent comprising a mixture of low surface-tension organic solvents having substantially different boiling points, including a solvent having a high boiling point adapted to improve the spreading qualities of and persist in the mixture until it nears the final stage of reaction.

ROBERT W. BELFIT.